US008776349B2

(12) United States Patent
Park

(10) Patent No.: US 8,776,349 B2
(45) Date of Patent: Jul. 15, 2014

(54) METHOD FOR ASSEMBLING SYNCHRONIZER AND JIG FOR ASSEMBLING SYNCHRONIZER

(75) Inventor: Jongyun Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 348 days.

(21) Appl. No.: 13/304,150

(22) Filed: Nov. 23, 2011

(65) Prior Publication Data

US 2012/0279038 A1    Nov. 8, 2012

(30) Foreign Application Priority Data

May 4, 2011    (KR) .................. 10-2011-0042680

(51) Int. Cl.
*B23Q 3/00* (2006.01)
*B25B 27/14* (2006.01)

(52) U.S. Cl.
USPC ............... 29/464; 29/281.1; 29/270; 29/468; 29/451

(58) Field of Classification Search
USPC ............. 29/464, 468, 469, 451, 893.1, 893.2, 29/226, 270, 271, 281.1, 559
See application file for complete search history.

(56) References Cited

U.S. PATENT DOCUMENTS

| | | | |
|---|---|---|---|
| 4,649,613 A * | 3/1987 | Bednarik | 29/253 |
| 5,113,985 A * | 5/1992 | Frost | 192/53.341 |
| 5,613,289 A * | 3/1997 | Zauner | 29/407.08 |
| 5,966,802 A * | 10/1999 | Sonntag et al. | 29/714 |
| 6,994,196 B2 * | 2/2006 | Shimura | 192/53.343 |
| 8,181,326 B2 * | 5/2012 | Silliman et al. | 29/451 |
| 8,490,262 B2 * | 7/2013 | Monyak et al. | 29/243.56 |
| 2004/0026204 A1 * | 2/2004 | Shimura | 192/53.3 |
| 2008/0004155 A1 * | 1/2008 | Miyagoe | 475/303 |
| 2011/0174586 A1 * | 7/2011 | Westerberg | 192/53.32 |

FOREIGN PATENT DOCUMENTS

| | | | | |
|---|---|---|---|---|
| JP | 8-85030 A | | 4/1996 | |
| JP | 10246245 A | * | 9/1998 | F16D 23/06 |
| JP | 11-201185 A | | 7/1999 | |
| JP | 11201185 A | * | 7/1999 | F16D 23/06 |
| KR | 1998-015881 U | | 6/1998 | |
| KR | 20020093217 A | * | 12/2002 | F16D 23/06 |
| KR | 1020020093217 A | | 12/2002 | |
| KR | 100412380 B1 | * | 12/2003 | F16D 23/06 |
| KR | 10-0461806 B1 | | 12/2004 | |
| KR | 200440125 Y1 | * | 5/2008 | F16D 23/06 |

OTHER PUBLICATIONS

Machine English translation of JP 11201185.*

* cited by examiner

*Primary Examiner* — Essama Omgba
(74) *Attorney, Agent, or Firm* — Morgan, Lewis & Bockius LLP

(57) ABSTRACT

A method for assembling a synchronizer by using a jig, the synchronizer including a synchronizer hub, at least one of recesses formed radially at an external circumference of the synchronizer hub, a synchronizer key disposed in the recess, a synchronizer sleeve enclosing the exterior circumference of the synchronizer hub and axially movably engaged to the synchronizer hub, and a spring disposed between the synchronizer hub and the synchronizer key, may include locating the synchronizer key and the spring in the recess of the synchronizer hub, engaging the jig to the synchronizer hub by inserting a rear portion of the jig in the recess axially, engaging the synchronizer sleeve to the synchronizer hub, and removing the jig from the synchronizer hub.

7 Claims, 5 Drawing Sheets

METHOD FOR ASSEMBLING SYNCHRONIZER AND JIG FOR ASSEMBLING SYNCHRONIZER

CROSS-REFERENCE TO RELATED APPLICATION

The present application claims priority to Korean Patent Application No. 10-2011-0042680 filed in the Korean Intellectual Property Office on May 4, 2011, the entire contents of which is incorporated herein for all purposes by this reference.

BACKGROUND OF THE INVENTION

1. Field of the Invention

The present invention relates to a method for assembling a synchronizer and a jig for assembling the synchronizer. More particularly, the present invention relates to a method for assembling a synchronizer and a jig for assembling the synchronizer which can increase productivity of the synchronizer.

2. Description of Related Art

Generally, torque generated at an engine is delivered to a differential apparatus through a transmission. Since a main shaft and a sub shaft of the transmission rotates with different rotation speeds, noise may occur or gears may be damaged if the gears respectively connected to the main shaft and the sub shaft of the transmission are suddenly engaged with each other. To solve such problems, various mesh types are used in a manual transmission.

Various mesh types of the manual transmission are a sliding mesh type, a constant mesh type, and a synchro mesh type. Recently, the synchro mesh type is mainly used in the manual transmission so as to make up for drawbacks of the sliding mesh type and the constant mesh type. After the rotation speeds of the gears of the main shaft and the sub shaft are virtually synchronized by using a synchronizer cone and a synchronizer ring as a clutch, both gears are engaged with each other through a synchronizer sleeve according to the synchro mesh type. A synchronizing device used in the synchro mesh type is called a synchronizer.

According to the synchronizer, a synchronizer hub is splined to the main shaft of the transmission, a synchronizer key is disposed in a plurality of recesses formed radially at an exterior circumference of the synchronizer hub, and a synchronizer sleeve is coupled to an exterior circumference of the synchronizer hub and is adapted to move axially. In addition, the synchronizer key is supported elastically by a spring so as to be closely contacted to an interior surface of the synchronizer sleeve.

According to conventional arts, the synchronizer is assembled by inserting the spring and the synchronizer key in the plurality of recesses after the synchronizer hub and the synchronizer sleeve are engaged.

Since a space between the plurality of recesses formed at the synchronizer hub and the synchronizer sleeve enclosing the exterior circumference of the synchronizer hub is not large in a state that the synchronizer hub and the synchronizer sleeve are engaged, the spring and the synchronizer key cannot be easily inserted in the recess.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a method for assembling a synchronizer and a jig for assembling the synchronizer having advantages of facilitating assembling of a synchronizer key and a spring.

In addition, a method for assembling a synchronizer and a jig for assembling the synchronizer which can increase productivity of the synchronizer by reducing assembling time will be provided.

In an aspect of the present invention, a method for assembling a synchronizer by using a jig, the synchronizer comprising a synchronizer hub, at least one of recesses formed radially at an external circumference of the synchronizer hub, a synchronizer key disposed in the recess, a synchronizer sleeve enclosing the exterior circumference of the synchronizer hub and axially movably engaged to the synchronizer hub, and a spring disposed between the synchronizer hub and the synchronizer key, may include locating the synchronizer key and the spring in the recess of the synchronizer hub, engaging the jig to the synchronizer hub by inserting a rear portion of the jig in the recess axially, engaging the synchronizer sleeve to the synchronizer hub, and removing the jig from the synchronizer hub.

The jig is adapted to prevent interference between the synchronizer key and the synchronizer sleeve by restricting a radially outer position of the synchronizer key.

The jig may include a pair of inner portions engaged to an interior circumferential portion of the recess, a pair of outer portions integrally formed with the pair of inner portions and positioned at an opening formed between external circumferential portions of the recess, a key receiving portion formed between the pair of inner portions, the synchronizer key being received therein, and a gear teeth receiving portion formed between the pair of outer portions to receive a gear teeth that is formed at an interior circumference of the synchronizer sleeve.

In another aspect of the present invention, a jig for assembling a synchronizer that may include a synchronizer hub, at least one of recesses formed radially at an external circumference of the synchronizer hub, a synchronizer key disposed in the recess, a synchronizer sleeve enclosing the exterior circumference of the synchronizer hub and axially movably engaged to the synchronizer hub, and a spring disposed between the synchronizer hub and the synchronizer key, wherein the jig is adapted to locate the synchronizer key and the spring at the synchronizer hub before the synchronizer sleeve is engaged to the synchronizer hub.

The jig is adapted to locate the synchronizer key and the spring at the synchronizer hub by being inserted in the recess axially.

The jig may include a pair of inner portions engaged to an interior circumferential portion of the recess, and a pair of outer portions integrally formed with the pair of inner portions and positioned at and engaged to an opening formed between external circumferential portions of the recess.

The inner portions support both side of the synchronizer key, and the outer portions support an opposite surface to a contacting surface of the synchronizer key with the spring in a state that the jig is engaged to the synchronizer hub.

A width of the opening is narrower than that of the interior circumferential portion in the recess, and a total distance between the pair of inner portions is larger than the width of the opening in the recess.

The jig may further include a key receiving portion formed between the pair of inner portions and adapted to receive the synchronizer key therein, and a gear teeth receiving portion formed between the pair of outer portions and adapted to receive a gear teeth formed at an interior circumference of the synchronizer sleeve.

The outer portion may have a wedge shape in an axial direction such that the outer portion pushes the synchronizer key toward the synchronizer hub as a rear portion of the jig is inserted in the recess axially.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
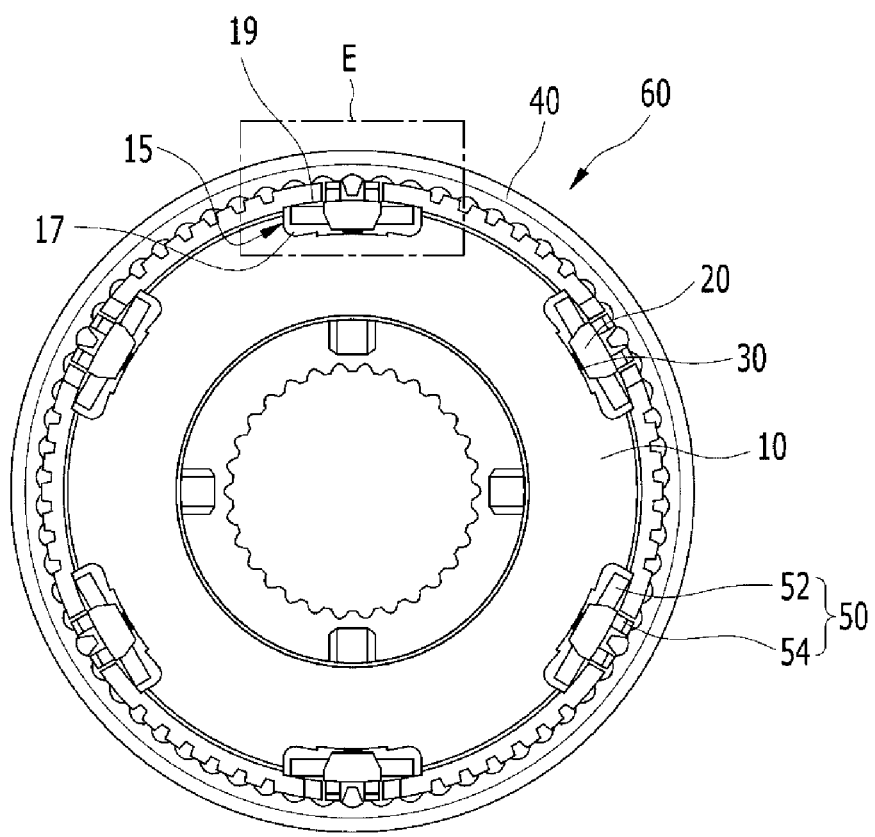
FIG. 1 is a top plan view of a jig for assembling a synchronizer with an assembled state with the synchronizer according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

FIG. 1 is a top plan view of a jig for assembling a synchronizer with an assembled state with the synchronizer according to an exemplary embodiment of the present invention.

As shown in FIG. 1, a synchronizer 60 according to an exemplary embodiment of the present invention includes a synchronizer hub 10, a synchronizer key 20, a synchronizer sleeve 40, and a spring 30.

The synchronizer hub 10 is splined to a main shaft of a transmission. In addition, at least one of recesses 15 is radially formed at an external circumference of the synchronizer hub 10.

The synchronizer key 20 is disposed in the recess 15. Width of an external circumferential portion 19 is narrower than that of an interior circumferential portion 17 in the recess 15.

The synchronizer sleeve 40 encloses the exterior circumference of the synchronizer hub 10 and axially movably engages with the synchronizer hub 10.

The spring 30 together with the synchronizer key 20 is disposed in the recess 15. The spring 30 is disposed between the synchronizer key 20 and the synchronizer hub 10 so as to apply elastic force to the synchronizer key 20 such that the synchronizer key 20 is closed contacted with an interior surface of the synchronizer sleeve 40.

Structure and function of the synchronizer 60 are well known to a person skilled in the art, and thus detailed description thereof will be omitted.

As shown in FIG. 1, a jig 50 is used for assembling the synchronizer according to an exemplary embodiment of the present invention.

The jig 50 enables the synchronizer key 20 and the spring 30 to be engaged with the synchronizer hub 10 in a state that the synchronizer hub 10 and the synchronizer sleeve 40 are not engaged.

Figure 2:
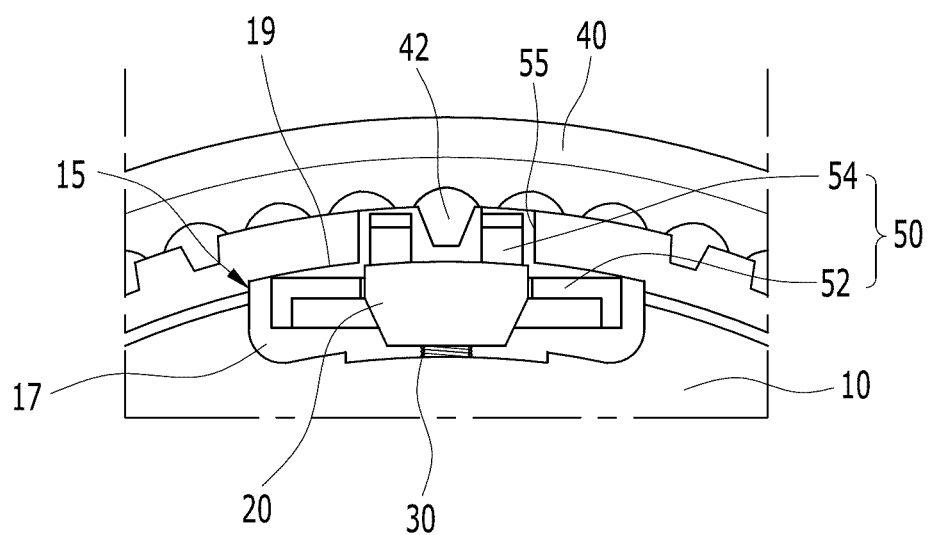
FIG. 2 is an enlarged view of E portion in FIG. 1.
Figure 3:
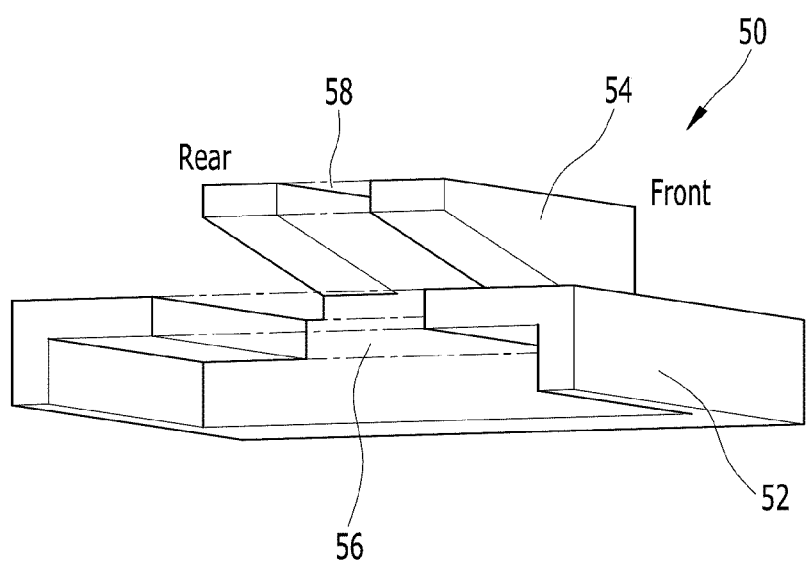
FIG. 3 is a perspective view for assembling a synchronizer according to an exemplary embodiment of the present invention.

Referring to FIG. 2 and FIG. 3, the jig for assembling the synchronizer according to an exemplary embodiment of the present invention will be described in detail.

FIG. 2 is an enlarged view of E portion in FIG. 1.

As shown in FIG. 2, the jig 50 for assembling the synchronizer according to an exemplary embodiment of the present invention includes a pair of inner portions 52 and a pair of outer portions 54. In one or more exemplary embodiments, the inner portion 52 and the outer portion 54 are integrally formed with each other.

The inner portion 52 is coupled to an interior circumferential portion 17 of the recess 15. In addition, as shown in FIG. 2, the inner portion 52 supports both sides of the synchronizer key 20 in the recess 15 in a state that the jig 50 is engaged with the synchronizer hub 10. Further, distance between the pair of inner portions 52 is larger than width of an external circumferential portion 19 of the recess 15 such that the jig 50 cannot leave from the synchronizer hub 10 in a radial outward direction.

The outer portion 54 is positioned in an opening 55 between the external circumferential portions 19 of the recess 15. In addition, as shown in FIG. 2, the outer portion 54 supports an opposite surface to a contacting surface of the synchronizer key 20 with the spring 30 in a state that the jig 50 is engaged to the synchronizer hub 10.

FIG. 3 is a perspective view for assembling a synchronizer according to an exemplary embodiment of the present invention.

As shown in FIG. 3, the jig 50 for assembling the synchronizer according to an exemplary embodiment of the present invention further includes a key receiving portion 56 and a gear teeth receiving portion 58.

The key receiving portion 56 prevents unnecessary movements of the synchronizer key 20 which, together with the spring 30, is positioned in the recess 15 when the jig 50 is engaged to the synchronizer hub 10. For this purpose, the key receiving portion 56 represents a space between the pair of inner portions 52 and the synchronizer key 20 is positioned in the space.

The gear teeth receiving portion 58 prevents or minimizes interference between the jig 50 and the synchronizer sleeve 40 when the synchronizer hub engaging with the jig 50 is engaged is engaged to the synchronizer sleeve 40. For this purpose, the gear teeth receiving portion 58 represents a space between the pair of outer portions 54, and a gear teeth 42 of the synchronizer sleeve 40 is positioned in the space. In addition, the outer portion 54 has a wedge shape such that the spring 30 and the synchronizer key 20 positioned in the recess 15 can be easily engaged with the jig 50. That is, as the jig 50 is inserted in the recess 15 in an axial direction, the outer portion 54 pushes the synchronizer key toward the synchronizer hub 10 and the spring 30 is further compressed.

As shown in FIG. 2, since interference between constituent elements of the synchronizer 60 is minimized by the jig 50 including the key receiving portion 56 and the gear teeth receiving portion 58, the synchronizer 60 can be easily assembled.

Figure 4:
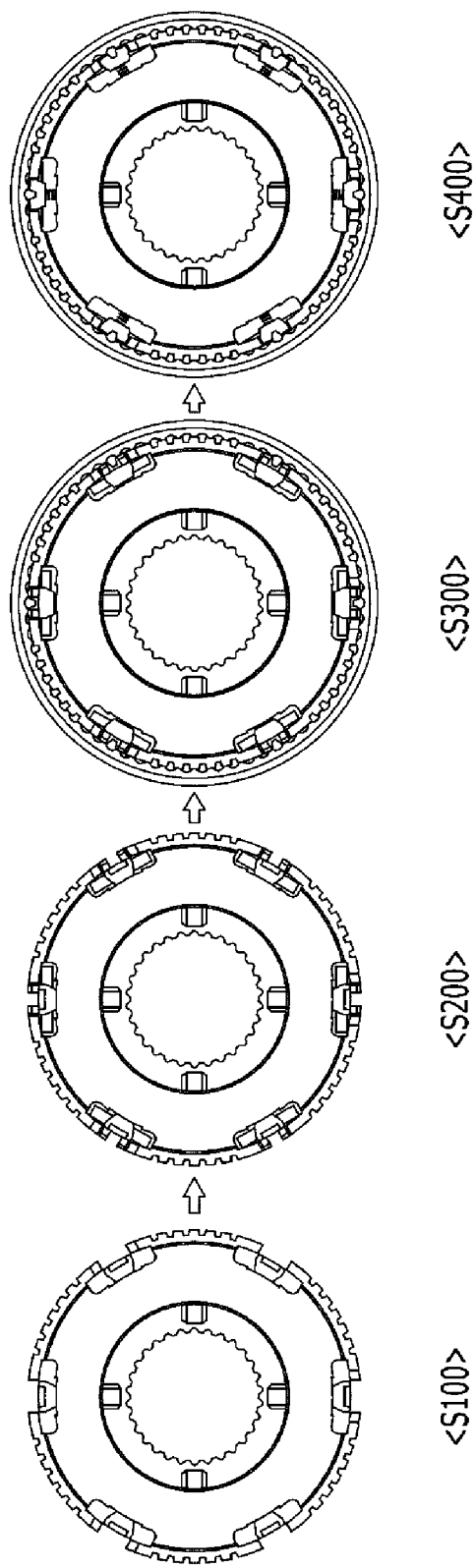
FIG. 4 is a top plan view for showing of a method for assembling a synchronizer according to an exemplary embodiment of the present invention.
Figure 5:
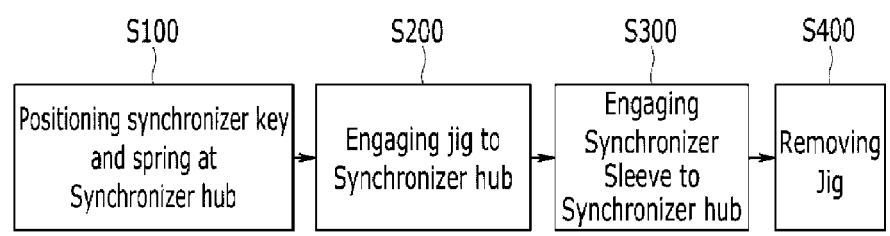
FIG. 5 is a flowchart of a method for assembling a synchronizer according to an exemplary embodiment of the present invention.

Referring to FIG. 4 and FIG. 5, a method for assembling a synchronizer according to an exemplary embodiment of the present invention will be described in detail.

FIG. 4 is a top plan view for showing of a method for assembling a synchronizer according to an exemplary embodiment of the present invention, and FIG. 5 is a flowchart of a method for assembling a synchronizer according to an exemplary embodiment of the present invention.

As shown in FIGS. 4 and 5, a method for assembling a synchronizer according to an exemplary embodiment of the present invention begins when the synchronizer sleeve 40 is not engaged to the synchronizer hub 10. At this state, the synchronizer key 20 and the spring 30 is positioned at the synchronizer hub 10 at a step S100. Meanwhile, the step S100 in FIG. 4 shows that the synchronizer key 20 and the spring 30 are positioned at the synchronizer hub 10.

In a state that the synchronizer key 20 and the spring 30 is positioned in the recess 15 of the synchronizer hub 10, rear of the jig 50 is inserted in the recess 15 in the axial direction such that the jig 50 is engaged to the synchronizer hub 10 at a step S200. At this time, the synchronizer key 20 is positioned in the key receiving portion 56 of the jig 50. In addition, as the jig 50 is inserted in the axial direction, the synchronizer key 20 is pushed in a radial inward direction by the outer portion 54 of the jig 50. Therefore, the outer portion 54 of the jig 50 restricts a radially outer position of the synchronizer key 20 and thus interference between the synchronizer key 20 and the synchronizer sleeve 40 is prevented when the synchronizer sleeve 40 is engaged to the synchronizer hub 10. The step S200 in FIG. 4 shows that the synchronizer key 20, the spring 30 and the jig 50 are assembled to the synchronizer hub 10.

After that, the synchronizer sleeve 40 is engaged to the synchronizer hub 10 at a step S300. As described above, since the radially outer position of the synchronizer key 20 is restricted by the outer portion 54 of the jig 50, the synchronizer sleeve 40 cannot be interfered with the synchronizer key 20. In addition, since the gear teeth 54 formed at the interior circumference of the synchronizer sleeve 40 is positioned in the gear teeth receiving portion 58, the interference between the synchronizer sleeve 40 and the synchronizer key 20 are further prevented. The step S300 in FIG. 4 shows that the synchronizer sleeve 40 is engaged to the synchronizer hub 10 engaging with the jig 50.

If the synchronizer sleeve 40 is engaged to the synchronizer hub 10, the jig 50 is removed at a step S400, and the method for assembling a synchronizer according to an exemplary embodiment of the present invention is finished. The step S400 in FIG. 4 shows that the jig 50 is removed in a state that the synchronizer hub 10 and the synchronizer sleeve 40 are assembled.

Since the synchronizer key 20 and the spring 30 is caught to the synchronizer hub 10 by the jig 50 before assembling the synchronizer sleeve 40, the synchronizer sleeve 40 can be easily assembled according to an exemplary embodiment of the present invention.

Therefore, the method for assembling a synchronizer according to an exemplary embodiment of the present invention can reduce assembling time of the synchronizer and increase productivity.

As described above, since a radially outer position of a synchronizer key is restricted and a gear tooth of a synchronizer sleeve is positioned at a specific position by using a jig, assembling of a synchronizer may be facilitated according to an exemplary embodiment of the present invention.

In addition, assemble time of the synchronizer may be reduced and productivity may increase.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for assembling a synchronizer by using a jig, the synchronizer comprising a synchronizer hub, at least one of recesses formed radially at an external circumference of the synchronizer hub, a synchronizer key disposed in the at least one of recesses, a synchronizer sleeve enclosing the external circumference of the synchronizer hub and axially movably engaged to the synchronizer hub, and a spring disposed between the synchronizer hub and the synchronizer key, the method comprising:

locating the synchronizer key and the spring in the at least one of recesses of the synchronizer hub;

engaging the jig to the synchronizer hub by inserting a rear portion of the jig in the recess axially;

engaging the synchronizer sleeve to the synchronizer hub; and removing the jig from the synchronizer hub;

wherein the jig comprises:

a pair of inner portions engaged to an interior circumferential portion of the recess;

a pair of outer portions integrally formed with the pair of inner portions and positioned at an opening formed between external circumferential portions of the recess;

a key receiving portion formed between the pair of inner portions, the synchronizer key being received therein; and a gear teeth receiving portion formed between the pair of outer portions to receive a gear teeth that is formed at an interior circumference of the synchronizer sleeve.

2. The method of claim 1, wherein the jig is adapted to prevent interference between the synchronizer key and the synchronizer sleeve by restricting a radially outer position of the synchronizer key.

3. A jig for assembling a synchronizer that comprises a synchronizer hub, at least one of recesses formed radially at an external circumference of the synchronizer hub, a synchronizer key disposed in the at least one of recesses, a synchronizer sleeve enclosing the exterior circumference of the synchronizer hub and axially movably engaged to the synchronizer hub, and a spring disposed between the synchronizer hub and the synchronizer key, wherein the jig is adapted to locate the synchronizer key and the spring at the synchronizer hub before the synchronizer sleeve is engaged to the synchronizer hub, wherein the jig includes:

pair of inner portions engaged to an interior circumferential portion of the at least one of recesses;

a pair of outer portions integrally formed with the pair of inner portions and positioned at and engaged to an opening formed between external circumferential portions of the at least one of recesses;

a key receiving portion formed between the pair of inner portions and adapted to receive the synchronizer key therein; and a gear teeth receiving portion formed between the pair of outer portions and adapted to receive a gear teeth formed at an interior circumference of the synchronizer sleeve.

4. The jig of claim 3, wherein the jig is adapted to locate the synchronizer key and the spring at the synchronizer hub by being inserted in the recess axially.

5. The jig of claim 3, wherein the inner portions support both side of the synchronizer key, and the outer portions support an opposite surface to a contacting surface of the synchronizer key with the spring in a state that the jig is engaged to the synchronizer hub.

6. The jig of claim 3, wherein width of the opening is narrower than that of the interior circumferential portion in the recess, and a total distance between the pair of inner portions is larger than the width of the opening in the recess.

7. The jig of claim 3, wherein the outer portion has a wedge shape in an axial direction such that the outer portion pushes the synchronizer key toward the synchronizer hub as a rear portion of the jig is inserted in the at least one of recesses axially.

* * * * *